G. BETTINI.
MOVING PICTURE APPARATUS.
APPLICATION FILED AUG. 4, 1911.
1,210,887.
Patented Jan. 2, 1917.
3 SHEETS—SHEET 1.
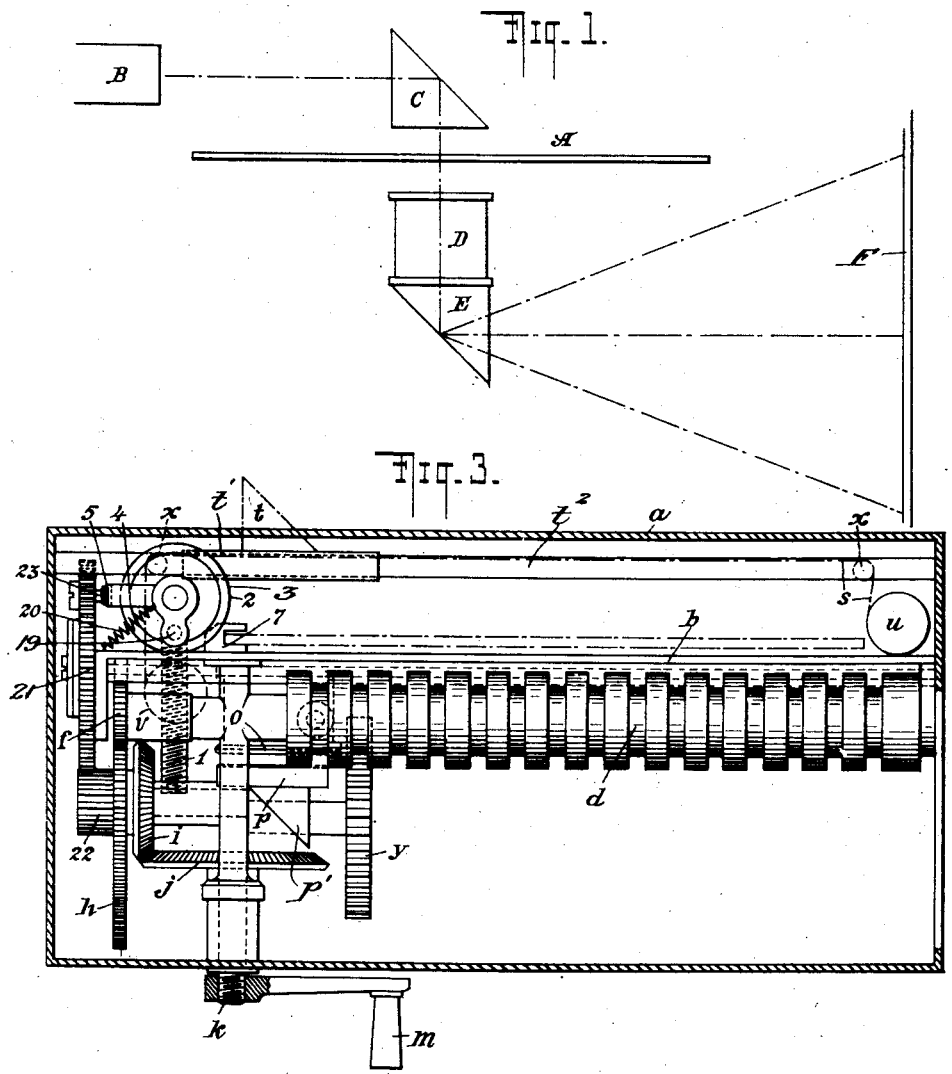
WITNESSES
INVENTOR
GIANNI BETTINI
BY
ATTORNEYS G. BETTINI.
MOVING PICTURE APPARATUS.
APPLICATION FILED AUG. 4, 1911.
1,210,887.
Patented Jan. 2, 1917.
3 SHEETS—SHEET 2.
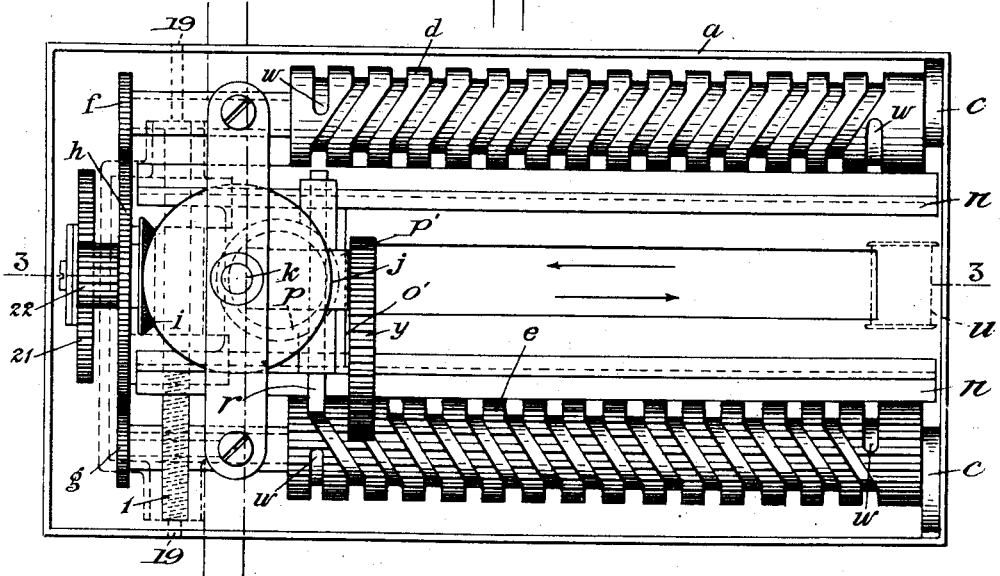
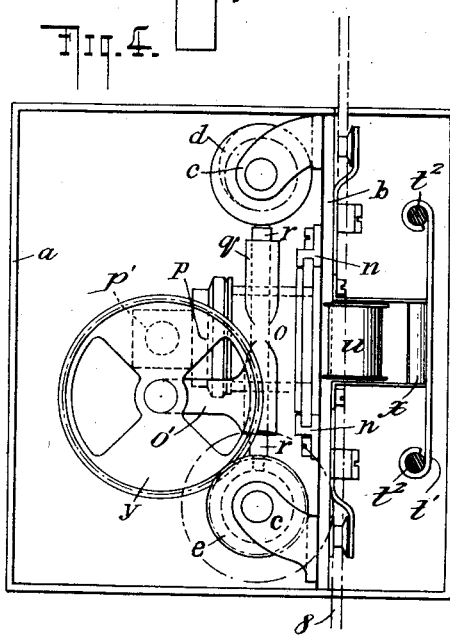
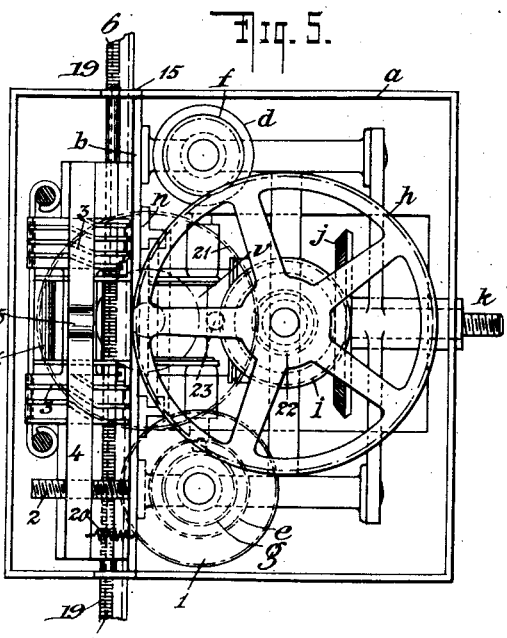
WITNESSES
G. V. Rasmussen
INVENTOR
GIANNI BETTINI
BY
ATTORNEYS G. BETTINI.
MOVING PICTURE APPARATUS.
APPLICATION FILED AUG. 4, 1911.
1,210,887.
Patented Jan. 2, 1917.
3 SHEETS—SHEET 3.
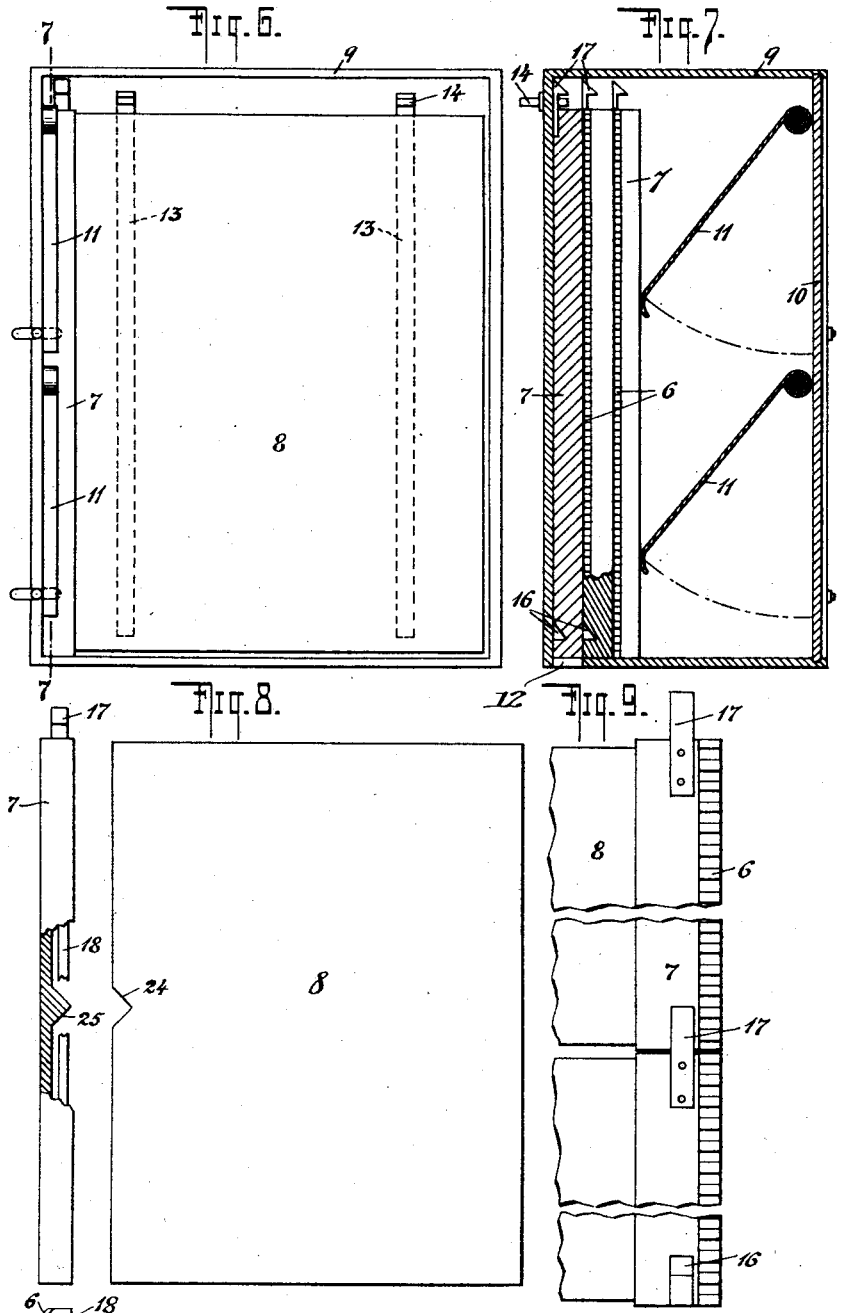
WITNESSES
G. V. Rasmussen
Ehru Shirlyoung
INVENTOR
GIANNI BETTINI
BY
Boresen Kraut
ATTORNEYS

UNITED STATES PATENT OFFICE.

GIANNI BETTINI, OF PARIS, FRANCE, ASSIGNOR TO BETTINI SYNDICATE, LIMITED, OF LONDON, ENGLAND, A CORPORATION OF GREAT BRITAIN.

MOVING-PICTURE APPARATUS.

1,210,887.  Specification of Letters Patent.  Patented Jan. 2, 1917.

Application filed August 4, 1911. Serial No. 642,250.

*To all whom it may concern:*

Be it known that I, GIANNI BETTINI, a subject of the King of Italy, and a resident of Paris, France, have invented a new and useful Improvement in Moving-Picture Apparatus, of which the following is a specification.

My invention relates to moving picture apparatus and particularly to a form of such apparatus in which the optical system used for projection or for picture taking is displaced with relation to a plate upon which are the images to be projected, or upon which the pictures are to be taken, said plate having and retaining a fixed position relative to the picture being taken or the screen upon which they are projected instead of as in the usual apparatus displacing the plate with relation to a fixed optical system.

More particularly my invention relates to apparatus of the above mentioned type, in which the pictures are projected upon or taken from a plane at right angles to the plane of the relatively fixed plate.

The object of my invention is to provide an apparatus of the specified type which shall be compact, simple and easily operated; and which, by reason of its construction and the use of ordinary photographic plates of small size shall be relatively inexpensive to manufacture and to maintain in operation.

My invention will be found particularly useful for amateurs and for home use, since the same apparatus may be used for both taking and projecting pictures and since the cost of the plates required is relatively inconsiderable.

The system is equally applicable to apparatus in which the pictures are taken on bands of film and on sensitized glass plates or cut films such as are generally employed in photography and when, in my claims, I speak of plates I intend to include films of any kind.

This novel system permits in particular, the manufacture of moving picture apparatus of comparatively simple construction and of very small volume with which the views may be obtained upon plates even of large size; the same apparatus serves for taking animated pictures and for projecting them. Most of the plate machines hitherto devised are based upon the principle of the well-known band apparatus, that is to say on the intermittent displacement of the photographs in front of a fixed objective; they present the disadvantage that the rapid displacement of the plates and of all the parts connected therewith, constituting a considerable mass, followed by sudden stoppages will produce vibrations both longitudinal and transverse of the apparatus and of the plates. These vibrations prevent good results from being obtained and furthermore make it necessary to construct the apparatus of excessive size and provide it with complicated mechanism.

With the apparatus which forms the subject matter of the present invention it is the optical system of very small weight which alone is displaced, the plate remaining stationary during such displacement so that all the defects enumerated above are avoided.

In the accompanying drawings which represent a preferred embodiment of my invention, Figure 1 is a diagram showing the principle upon which the invention is based; Fig. 2 is a general view of the box containing the mechanism, the cover being omitted; Fig. 3 is a section on the line 3—3 in Fig. 2; Figs. 4 and 5 are end views of the box represented in Figs. 2 and 3 from the right and left hand sides respectively; Fig. 6 shows a plate magazine intended to be fitted to the projection apparatus; Fig. 7 is a section of the plate magazine on the line 7—7 in Fig. 6; Fig. 8 is a detail view of a plate with its plate holder frame; Fig. 9 and Fig. 10 are detail views.

The principle upon which the apparatus is constructed is represented diagrammatically in Fig. 1 and provides for illuminating the photographs from a fixed source of light B including the usual condenser for projecting a pencil of parallel luminous rays, the axis of which would first of all be parallel with the plane of the plate or band A carrying the pictures instead of falling perpendicularly upon it as in all other methods of projection. The axis of the luminous pencil is then directed perpendicularly to the plate or band by means of a prism or other reflecting surface C which would deflect it from the parallel direction.

By means of an objective D combined with another prism or reflecting surface E and arranged on the other side of the plate or band the image is then projected on to a screen F arranged perpendicularly to the plane of the plate or band or in any other plane by employing suitably arranged supplementary reflecting surfaces.

In displacing the objective D and the prism E and the reflecting prism C with an intermittent synchronous reciprocating movement parallel with the plate or band A, the focusing is not altered and the photographs of the same row upon said plate will be successively illuminated and projected upon the screen F. It will thus only be necessary to lower or shift the plate or band A transversely of the path of movement of the objective at the end of each travel of the optical system for obtaining the projection of the next following row of pictures.

During the displacement of the objective D and prisms E and C, the field of exposure or of projection experiences a slight diminution or increase of size which is imperceptible to the eye, which increase or decrease being gradual and exceedingly small becomes confused with the increase or decrease of size experienced by the objects photographed according as they approach or recede from the apparatus. In projection this increase takes place in the reverse sense to what occurs when the pictures are taken because the smallest image (that which is most distant from the screen) will be enlarged the most, while the largest image (that which is the closest to the screen) will be less magnified and consequently the increase of size in projection taking place in the opposite sense to what occurs when the pictures are taken the projection will be absolutely fixed even if the difference in size between the images should be very considerable.

In cases where bands of films are employed instead of plates, these films (of suitable size) would have the pictures arranged as on the plates, that is to say, in successive rows and these bands would be arranged in the apparatus on rollers behind the objective as in the case in photographic apparatus of the kodak type.

As a modification of the system comprising the fixed source of light B and reflecting prism C described above any convenient source of light of small volume (Nernst lamp of suitable dimensions rendered incandescent, etc.) combined with a small condenser might be employed and without the use of any reflecting prism this arrangement would illuminate the views directly and in succession if displaced synchronously with the objective.

One and the same apparatus based upon the principle described is adapted with equal facility for taking animated pictures and for projecting them. For taking the pictures with the apparatus closed and forming a dark chamber it will be sufficient to utilize sensitized plates or films; the source of light B and the reflecting prism C would then not be utilized.

Both in taking pictures and in projecting them all the movements of the optical system would be masked by an appropriately arranged shutter.

As regards the mechanism proper, the apparatus comprises a metal or other suitable box $a$ provided with an intermediate partition or base plate $b$ intended to support the mechanism within the box (see Figs. 2-5). Bearings $c$, rigidly connected with this partition, support cam screws $d$, $e$ of contrary but equal pitch, carrying respectively at one of their ends pinions $f$ and $g$ (Fig. 2) in mesh with a toothed wheel $h$ common to them both which is mounted upon the shaft of a bevel pinion $i$ which is in mesh with and controlled by a bevel wheel $j$ (Fig. 3) keyed to the shaft $k$ of the operating handle $m$.

A slideway $n$ formed on the base plate $b$ serves as a guide for a sliding reciprocating carriage $o$ carrying the objective $p$ and the prism or reflector $p'$ shown graphically as D and E in Fig. 1. This carriage also supports a transversely disposed lug, bored out or provided with a slot in which there is mounted a rod $r$, the ends of which are adapted to engage alternately with the cam grooves of the two cam screws $d$, $e$. The carriage $o$ carrying the objective is connected in any suitable manner as by a band $s$ with another carriage $t'$, slidable longitudinally on rods $t^2$, and carrying the second prism $t$ arranged in front of the source of light. This band passes over spring boxes $u$ and $v$, and over rollers $x$, in order to insure synchronous displacement of the prism $t$ and the objective $p$. A circular shutter $y$ is revolubly mounted upon a laterally extending lug $o'$ upon the support $o$ of the objective and is provided with external gear teeth whereby its movement is controlled by the longitudinal gear teeth on the cam screw $e$. The bottom of the threads of the cam screws $d$, $e$ rise at each end of these screws as at $w$ and die away on the outer surface of the respective screws, so that when the rod $r$ reaches the end of the cam in one screw, it is forced out of engagement therewith and the opposite end enters the cam of the other cam screw, thereby insuring reciprocating operation of the carriage $o$ carrying the objective.

Upon the shaft of the cam screw $e$ there is mounted a spiral gear 1 which meshes with another spiral gear 2 upon the shaft of which a cam screw 3 is mounted in such a way as to enable it to mesh with teeth 6 on a plate holder frame 7 (Figs. 3 and 5). The pitch of the cam screw 3 is the same as the distance between the teeth 6 of the frame 7 which is adapted to carry the plate 8 (Fig. 9). For the purpose hereinafter stated, the assemblage is mounted to oscillate around the shaft 19 and is acted upon by the spring 20 which is adapted to move the assemblage in one direction and normally to hold screw 3 out of mesh with teeth 6. A toothed wheel 21 driven by a toothed pinion 22 rigid with the wheel $h$ carries a tappet 23, which is adapted at each revolution of the wheel to strike the cam-boss 5 located on the yoke 4 connected with the assemblage, which, as previously stated, is pivoted at 19. The rocking of the assemblage is for the purpose of moving the cam screw 3 into and out of mesh with the teeth 6 at the proper intervals. The relation between the number of teeth on the gear 21, pinion 22, gear $h$ and pinions $f$ and $g$ is such that the carriage $o$ is driven from one end of its run to the other during the intervals of contact of the tappet 23 with the boss 5.

When the tappet 23 contacts with boss 5 the assemblage is rocked about 19 against the pull of the spring 20 to throw the cam screw 3 into engagement with the teeth 6. The continued rotation of the cam screw while in mesh with teeth 6 feeds the plate 8, and such feeding continues until the tappet 23 passes off boss 5, thus enabling the spring to retract the assemblage. The tappet and boss are so arranged that the assemblage is retracted after the plate has moved a distance corresponding to that between successive rows of pictures, thus feeding the plate one step, or to the next row of pictures.

Each plate 8 is mounted by one of its edges in a frame 7. Each plate is provided with a notch 24 (Fig. 8) corresponding to a tooth or other suitable stop 25 arranged in the frame so that the plates can always be placed in exactly the same position relatively to the frame and thus each picture be brought into exactly the same position in front of the projective. Each frame 7 is furnished on its ridge or corner edge with rack teeth 6, as previously described, the distance between which corresponds with the height of the pictures on the plate. The plate 8 is adapted to be held in position in the frame by leaf springs 18 (Fig. 10).

The plates and frames are arranged in proper order in a plate magazine, which is represented in Figs. 6 and 7 and comprises a box 9 furnished on its rear face with a door 10 for loading, and provided on one of its faces with a suitable number of springs 11 serving to press the plate frames 7 toward a slot 12 through which the plates and frames may be removed from the magazine. The magazine is placed on the box $a$ in such a way that slot 12 registers with slot 15 in casing $a$. The front face of box 9 is provided with one or more slots 13 and one or more tappets 14 by means of which the foremost plate may be depressed, at the commencement of the operation of the machine so that its teeth 6 engage with the cam screw 3.

As previously set forth in the specification the apparatus according to my invention herein disclosed may be used either for projecting or taking animated pictures. Wherever, therefore, any of the following claims are restricted in terms to a projecting apparatus, I intend them to be construed so as to cover an apparatus for taking pictures as well.

As shown in Figs. 7 and 9 each plate frame 7 is provided with projections 17 and notches 16, the projection of one plate being adapted for engagement with the notch 16 of the succeeding plate, so that as one plate finally leaves the magazine the succeeding plate will be pressed into operative engagement therewith by springs 11 and be pulled downward so that eventually each plate will follow the other without interruption, in such a manner that pictures may be taken or projected during a long period of time.

The operation is as follows: The plate magazine 9 is arranged in place on the projection casing $a$, care being had that the slot 12 registers with the slot 15, any convenient device being provided for insuring the correct position of the two casings and keeping them in this position. The tappet 14 is depressed to cause the first plate to descend with its frame so that they occupy the position represented in Fig. 3. The prism $t$ is then in front of the first picture of the lower row of this plate.

Having described my invention, I claim:

1. In a moving picture machine the combination of a plate, an objective, means for bending a beam of light so as to pass through said plate and through said objective, and means for simultaneously moving said bending means and said objective with reference to said plate.

2. In a moving picture machine the combination of a plate, an objective, means for bending a beam of light so as to pass through said plate and through said objective, and means for intermittently and simultaneously moving said bending means and said objective with reference to said plate.

3. In a moving picture machine the combination of a plate, an objective, means for bending a beam of light so as to pass through said plate and through said objective, means for intermittently and simultaneously moving said bending means and said objective with reference to said plate, and means for intermittently interrupting the light beam as said bending means and said objective are moved.

4. In a moving picture machine the combination of a plate, an objective, means for bending a beam of light so as to pass through said plate and through said objective, means for intermittently and simultaneously moving said bending means and said objective with reference to said plate, and a shutter arranged to open and shut in synchronism with the periods of rest and movement of the aforesaid bending means and objective.

5. In a moving picture machine the combination of a plate, an objective on one side of said plate, means on the other side of said plate for bending a beam of light so as to pass through said plate and through said objective, means for intermittently and simultaneously moving said bending means and said objective in planes parallel to said plate, and means for periodically interrupting the light beam as said bending means and said objective are moved.

6. In a moving picture machine the combination of a plate, an objective on one side of said plate, means on the other side of said plate for bending a beam of light so as to pass normally through the plate and objective, and means for intermittently moving said bending means and said objective in planes parallel to the plate.

7. In a moving picture machine the combination of a plate, an objective on one side of said plate, means on the other side of said plate for bending a beam of light so as to pass normally through the plate and objective, means for intermittently moving said bending means and said objective in planes parallel to the plate, and means for periodically interrupting the light beam as said bending means and said objective are moved.

8. In a moving picture machine the combination of a plate, an objective on one side of said plate, means on the other side of said plate for bending a beam of light so as to pass through the plate, means for intermittently moving the objective with reference to the plate and means for directing said beam through said objective in each of its several positions.

9. In a moving picture machine the combination of a plate, an objective adapted to be intermittently moved laterally, means for bending a beam of light so as to pass through predetermined regions of said plate and through said objective, and means for moving the plate vertically after a series of intermittent lateral movements of the objective.

10. In a moving picture machine the combination of a plate, an objective adapted to be intermittently moved laterally, means for bending a beam of light so as to pass through predetermined regions of said plate and through said objective, and means for intermittently moving the plate vertically.

11. In a moving picture machine the combination of a plate, means for bending a beam of light corresponding to an image upon said plate, an objective in the path of said beam between said bending means and said plate and means for intermittently moving said objective and the bending means parallel to said plate.

12. In a moving picture machine the combination of a plate, an objective adapted to be moved parallel to said plate, a reflector fixed to and movable with said objective and on the side of said objective remote from said plate and means for intermittently moving said reflector and objective parallel to said plate.

13. In a moving picture machine a plate, an objective on one side of said plate adapted to be intermittently moved parallel thereto, means on the other side of said plate for bending a beam of light so as to pass through a predetermined region of said plate and through said objective, and means coöperating with said objective on the side of the objective remote from said plate to again bend the light beam.

14. In a moving picture machine, the combination of a plate, means for sending a beam of light substantially parallel to said plate, and a movable optical system comprising means upon one side of said plate for intercepting and deflecting said beam normally through said plate and means upon the other side of said plate for again bending the beam parallel to the plate and then forming a projected image and means for simultaneously moving both of said means with reference to said plate.

15. In a moving picture machine, the combination of a plate, means for sending a beam of light substantially parallel to said plate, and a movable optical system comprising means upon one side of said plate for intercepting and deflecting said beam normally through said plate and means upon the other side of said plate for again bending the beam parallel to the plate and then forming a projected image and means for simultaneously and intermittently moving both of said means with reference to said plate.

16. In a moving picture machine the combination of a plate, an objective adapted to be moved intermittently parallel to the plate, and means for bending a beam of light emitted parallel to the plate so as to pass normally through the plate and the objective and then to retake its original direction so as to form a projected image in a plane at a right angle to the plane of the plate.

17. In a cinematograph for projections, the combination of a picture carrying surface, having a plurality of pictures thereon, adapted to be held stationary during the projection of adjacent consecutive pictures, a source of light which is relatively stationary and which is adapted to concentrate a pencil of luminous rays parallel to the plane of said surface, an optical system for deflecting the light rays at right angles to their original axis adapted to be moved parallel to said surface to successively stand in front of each picture so as to have them successively lighted at the right moment, and an optical system for successively projecting the pictures as lighted which is adapted to be moved in a parallel direction on the other side of the picture surface for projecting the lighted pictures upon a plane at right angles to the line of displacement of the optical systems, said two optical systems being adapted to be moved synchronously in the same direction.

18. In a cinematograph for projections, the combination of a periodically stationary picture carrying surface, two optical systems, one adapted to direct the required light upon each picture in succession and the other adapted to project the lighted pictures onto a screen at right angles to said surface, and means for moving the two optical systems synchronously in the same direction, each in a different plane parallel to and on opposite sides of said picture carrying surface.

19. In a cinematograph, an optical system adapted to be moved after projecting each successive picture, a surface for carrying pictures, said surface being held stationary during the projection of adjacent consecutive pictures in rows and means for moving said surface transversely of the rows after each row has been projected.

20. In a cinematograph, a picture carrying surface, a stationary source of light adapted by suitable means to direct a pencil of luminous rays parallel to said picture carrying surface, means adapted to intercept and deflect said rays so as to pass perpendicularly through said surface at any predetermined point along a strip of the surface parallel to said pencil rays, means on the side of the picture carrying surface opposite from the source of light, located in line to receive the deflected pencil of rays after passing through said surface and adapted to project and again deflect said rays so that the axis thereof shall be substantially parallel to the rays leaving the source of light, the axis of the doubly bent pencil of rays remaining at all times in the same plane, means for intermittently moving the perpendicular portion of said pencil of rays so that it will successively pass through adjacent portions of a strip of the picture carrying surface, and means for moving said picture carrying surface to successively bring adjacent strips of said surface into the path of the perpendicular portion of said pencil of rays.

21. In a cinematographic apparatus for projecting purposes, the combination of a picture carrying surface held stationary during the projection of adjacent consecutive pictures, an optical system adapted to move along one side of said surface and illuminating means adapted to move in synchronism with said optical system in the same plane and in the same direction but on the opposite side of the picture carrying surface.

22. In a plate cinematograph, in which the plate is adapted to remain stationary during the projection of animated pictures upon a screen placed perpendicularly to the plane of the plate, means for directing a pencil of light perpendicularly through said plate, and projecting it on to said screen and means for intermittently moving the perpendicular portion of said pencil of light to pass successively through different portions of said plate.

23. In a plate cinematograph, a case, two cam screws having equal and inversely directed pitches, mounted for rotation in said case, a carriage adapted to support an objective, mounted to slide parallel to said cam screws and to the plate, a rod mounted on said carriage and adapted to alternately engage said cam screws, gears for simultaneously and continuously rotating said cam screws in one direction to move said carriage intermittently forward and back along the screws and means for directing light through regions of the plate corresponding to the various positions of the carriage.

24. In a plate cinematograph for projection purposes, the combination of a frame carrying the objective and adapted to move over one surface of the plate, a frame which carries means for illuminating the pictures and is adapted to move over the opposite surface of the plate and means for synchronously moving said frames over the respective surfaces.

25. In a moving picture machine, the combination of a plate, an objective, means for intermittently moving said objective transversely across the face of said plate, means for bending a pencil of light, originally parallel to said plate so as to pass perpendicularly through adjacent consecutive portions transversely of said plate and through said objective, and means for intermittently moving said plate at right angles to the plane of movement of said objective to bring adjacent transverse strips of said plate into the field of said objective.

26. In a moving picture machine, the combination of a plate, a source of light provided with a condenser for directing a pencil of light along one side of and parallel to said plate, a screen for receiving projected pictures at right angles to the plane of said plate, said screen, plate and condenser having fixed positions relative to each other, means on the condenser side of said plate for bending the pencil of light so as to pass perpendicularly through said plate, means on the other side of said plate for again bending and for projecting said pencil of light on to said screen, and means for intermittently moving the objective and bending means together with the perpendicular portion of the pencil of light widthwise of said plate toward and from said screen.

27. In a moving picture machine the combination of a plate adapted to carry a plurality of horizontal rows of pictures, the pictures in successive rows being alternately progressively increasing in size and progressively decreasing in size across the plate, said plate being at right angles to the picture as projected and optical means for projecting said pictures, said optical means being adapted to project such pictures so that the projections thereof are uniform in size.

28. In a moving picture machine the combination of a picture carrying plate adapted to be held stationary during the projection of adjacent consecutive pictures, a screen at right angles to the plane of said plate for receiving the projected pictures, an objective movable along one side of and parallel to said screen, a condenser on the other side of said plate for directing a pencil of light parallel to said plate, means in the path of said pencil of rays for deflecting the rays perpendicularly through said plate at predetermined points thereof and through said objective, means for intermittently moving said objective toward and from said screen and means controlled by the movement of said objective for moving the deflecting means on the opposite side of said plate in the same direction and synchronously with said objective.

29. In a cinematographic apparatus for projecting animated pictures, the combination of a plate and of an optical system comprising an objective and a reflector adapted to be intermittently moved in a plane which is parallel to said plate for projecting pictures into a plane perpendicular to the plate.

30. In a moving picture machine the combination of a plate, means upon one side of the plate for bending a beam of light corresponding to an image upon said plate, an objective in the path of said beam on the same side of the plate as the bending means, and means for intermittently moving said objective and the bending means parallel to the plate.

In witness whereof I have hereunto set my hand in the presence of two subscribing witnesses.

GIANNI BETTINI.

Witnesses:
H. C. COXE,
JOHN BAKER.